United States Patent [19]

Martinez, Jr.

[11] Patent Number: 4,792,091

[45] Date of Patent: Dec. 20, 1988

[54] METHOD AND APPARATUS FOR HEATING A LARGE BUILDING

[76] Inventor: George Martinez, Jr., P.O. Box 1141, Gonzales, La. 70737

[21] Appl. No.: 164,139

[22] Filed: Mar. 4, 1988

[51] Int. Cl.⁴ .......................... F25D 3/08; F24H 1/22
[52] U.S. Cl. ......................................... 237/19; 62/79; 62/238.6; 165/2; 237/2 B
[58] Field of Search ............... 62/238.6, 79; 165/2; 237/2 B, 19

[56] References Cited

U.S. PATENT DOCUMENTS

| | | | |
|---|---|---|---|
| 3,523,575 | 8/1970 | Olivieri | 62/238.6 |
| 4,189,096 | 2/1980 | Girard | 237/2 B |
| 4,277,952 | 7/1981 | Martinez, Jr. | 62/115 |
| 4,293,093 | 10/1981 | Raymond et al. | 237/19 |
| 4,458,498 | 7/1984 | Kajino | 62/238.6 X |
| 4,507,938 | 4/1985 | Hama et al. | 237/2 B X |
| 4,559,788 | 12/1985 | McFarlan | 62/238.6 X |

Primary Examiner—Lloyd L. King
Attorney, Agent, or Firm—David L. Ray

[57] ABSTRACT

A method and apparatus for utilizing heated water from an air conditioning condenser to heat water used to control temperatures in a large building including a heat exchanger connected to an air conditioner condenser for receiving water heated by the air conditioner condenser and transmitting said water from said heat exchanger to a cooling tower, the heat exchanger also having connected thereto a liquid circuit means for circulating hot water to heating coils located in the building, the heat exchanger effecting a heat exchanger between the hot water received from the condenser and the water to be utilized for heating the building.

9 Claims, 1 Drawing Sheet

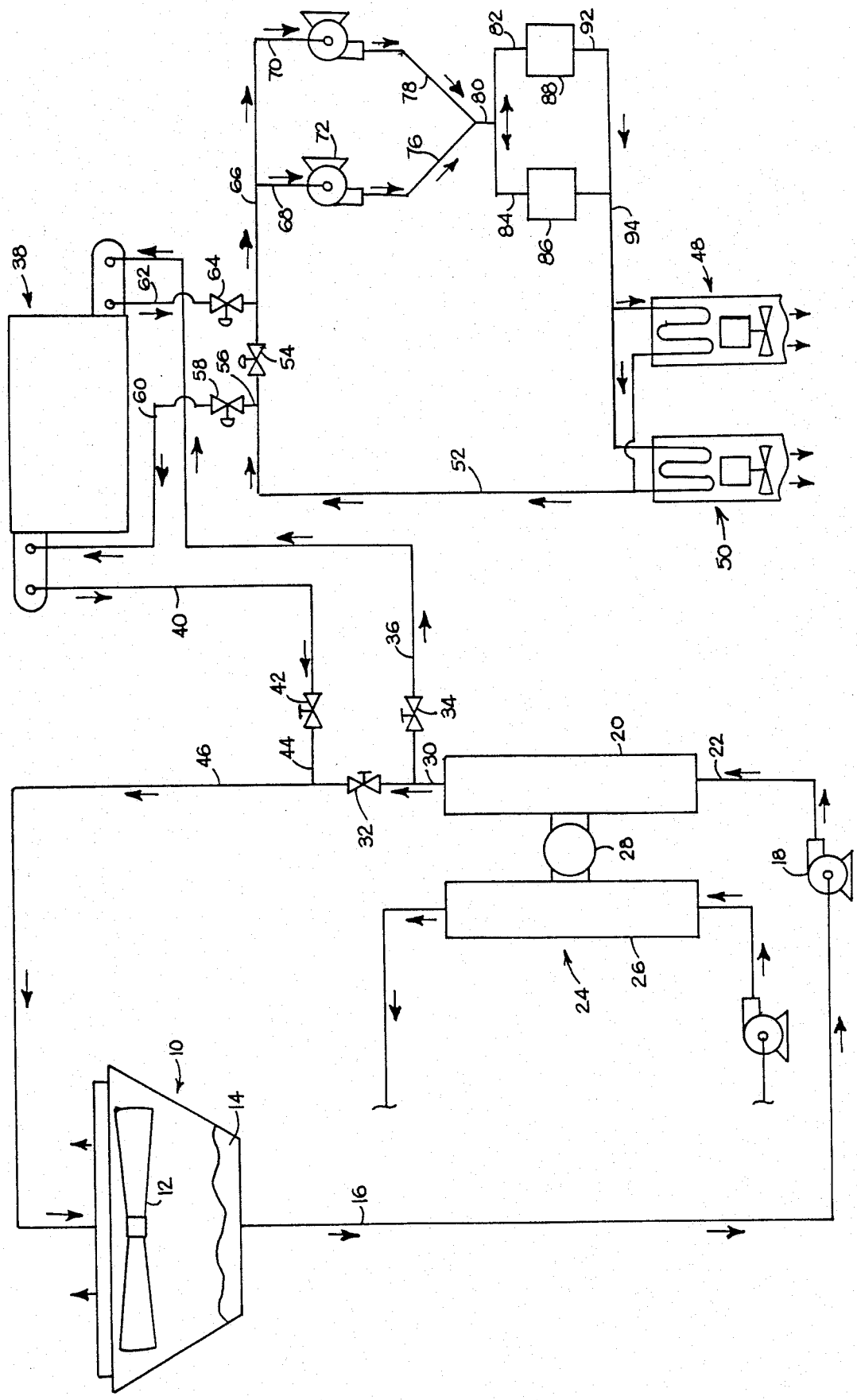

METHOD AND APPARATUS FOR HEATING A LARGE BUILDING

BACKGROUND OF THE INVENTION

1. Field of the Invention

The present invention relates to a method and apparatus for supplying heated water to a large building. In particular, the invention relates to a method and apparatus for recovering heat from the condenser of an air conditioner compressor and utilizing recovered heat to heat water used in controlling the temperature of a large building.

2. Description of the Related Art

It is well known in the art to use hot water to control the temperature of a large building. The water may be heated by direct fired boilers, which burn natural gas or other fuel. The water may also be heated by electrical heating coils, or by boilers which produce steam which flows to heat exchangers, commonly called steam converters, to heat hot water.

The hot water is circulated to heating coils located throughout the building and returned to the boiler or steam converter to be reheated and again circulated to the heating coils throughout the building. The heating coils are used for heating the air within the building. Such heating coils are commonly located in the ducts or vents, sometimes referred to in the art as air handlers, supplying air to the various rooms in the building to heat the air flowing to the rooms when desired. Heated water supplied to such heating coils from direct fired boilers or steam converters is referred to herein as "reheat water".

Reheat water is used to heat air in the building at various locations throughout the building. The heating coils receiving reheat water are commonly located adjacent to cooling coils receiving chilled liquids or gases from air conditioning units. Both the cooling coils and the heating coils are commonly located adjacent to each other in the duct or air handler supplying conditioned air to a room in a building. If it is desired to raise the temperature of a room being cooled by air blown over cooling coils, reheat water is directed to heating coils which are located in the airstream. Thus the heating coils receiving reheat water can raise the temperature of the conditioned air being introduced into a room as desired.

Operation of direct fired boilers and steam boilers employing steam converters to provide reheat water requires large amounts of energy. When operating large air conditioning units during the summer it is still necessary for the large building employing such units to operate boilers to provide reheat water to maintain individual control of the temperature of various areas in the building being air conditioned.

U.S. Pat. No. 4,277,952 discloses a method and apparatus for conserving energy in an air conditioning system in which the air conditioning units are turned off and the cooling tower is operated when ambient conditions permit to provide cold water to heat exchangers. Chilled water needed to cool the building is circulated through the heat exchanger and the heat exchange is effected between the chilled water and the cool water supplied by the cooling tower.

SUMMARY OF THE INVENTION

It is an object of the present invention to recover heat from the condenser of an air conditioning unit to heat water used for reheat water in a large building.

It is another object of the present invention to provide a heat exchanger through which water from an air conditioning condenser flows prior to the water from the condenser flowing to a cooling tower to provide a source of hot water to the heat exchanger which can be utilized to heat reheat water required by the building.

In accordance with the present invention there is provided a method and apparatus for utilizing heated water from an air conditioning condenser to heat water used to control temperatures in a large building including a heat exchanger connected to an air conditioner condenser for receiving water heated by the air conditioner condenser and transmitting said water from said heat exchanger to a cooling tower, the heat exchanger also having connected thereto a liquid circuit means for circulating hot water to heating coils located in the building, the heat exchanger effecting a heat exchange between the hot water received from the condenser and the water to be utilized for heating the building.

The present invention provides a virtually free source of heat and resulting free reheat water by utilizing the heat removed from an air conditioner condenser to heat the reheat water. Normally condenser water is cooled by a cooling tower alone and the heat is rejected to the atmosphere.

Further savings are realized in the amount of time saved in the operation of the cooling tower fan because heat absorbed in the heat exchanger does not have to be rejected by the cooling tower, therefore reducing the amount of time the cooling tower fan must operate.

BRIEF DESCRIPTION OF THE DRAWING

The drawing is a schematic representation of the method and apparatus of the present invention.

DESCRIPTION OF THE PREFERRED EMBODIMENTS

Referring now to the drawing, there is shown a cooling tower generally indicated by the numeral 10 and shown in schematic form. The cooling tower has a fan 12 indicated by the numeral 12 and a sump 14 therein containing water. Cool water flows from sump 14 of cooling tower 10 through pipe 16 as indicated by the arrows.

From pipe 16 cool water enters pump 18 and flows to air conditioner condenser 20 through pipe 22. Condenser 20 is part of a conventional air conditioning unit generally indicated by the numeral 24 having evaporator 26, compressor 28, and pump 25 for circulating chilled water through evaporator 26. Return chilled water enters evaporator 26 through pipe 27 and supply chilled water exits from evaporator 26 through line 29. Supply chilled water travels to the various areas in the building requiring chilled water such as air handlers, for example. Water entering condenser 20 through pipe 22 absorbs heat from condenser 20 and exits condenser 20 through pipe 30.

When it is desired to utilize heat from condenser 20 to provide heat for reheat water, valve 32 is closed and the water from condensor 20 enters pipe 31 and continues onward through open valve 34. From valve 34 the water continues through pipe 36 in the directions indicated by the arrows to a heat exchanger generally indicated by the numeral 38.

The heat exchanger 38 may be a conventional plate frame heat exchanger, a shell-and-tube heat exchanger, or any other type of conventional heat exchanger. The water from condenser 20 exits heat exchanger 38 through pipe 40 and flows through open valve 42 to pipe 44. From 44 water flows through pipe 46 to cooling tower 10. Heat is rejected at cooling tower 10 by cooling tower fan 12 and the liquid falls to the cooling tower sump 14.

Return hot water (reheat water) from the heating coils or air handlers generally indicated at 48 and 50 located throughout the building returns through pipe 52. Although only two air handlers are shown, many more may be required in a large building. The air handlers may also have cooling coils (not shown) therein for receipt of chilled water from pipe 29.

Valve 54 is closed causing the return hot water to flow through pipe 56 and through open valve 58 through pipe 60 to and through heat exchanger 38.

From heat exchanger 38 the reheat water is heated and exits through 62. Valve 54 is closed causing water in pipe 62 to flow through open valve 64 and on to pipe 66. Water from pipe 66 flows to pipes 68 and 70 to and through pumps 72 and/or 74 depending upon which pumps are being operated. Water then flows through pipe 76 and/or 78 through pipe 80 and pipes 82 and 83 to and through steam converters or direct fired boilers 86 and 88.

When air conditioning unit 24 is in operation, boilers or steam converters 86 and 88 are turned off. Heat exchanger 38 supplies the heat necessary to heat reheat water flowing to air handlers or heating coils 48 and 50. Steam converters are well known in the art and are heat exchangers which have steam lines (not shown) running thereto from which steam is provided by a boiler. The steam heats the converters and effects a heat exchange or heating of water exiting therefrom through lines 90 and 92.

Heated water from pipes 90 and 92 travels to and through pipe 94 which distributes hot water to the numerous hot water coils or air handlers 48 and 50 throughout the building to provide reheat water. The hot water is returned from heating coils in the building to pipe 52.

When it is not desired to utilize heat from condenser 20 to heat reheat water, valve 32 is opened, valves 34 and 42 are closed, valve 54 is opened, and valves 58 and 64 are closed.

Although the preferred embodiments of the present invention have been disclosed and described in detail above, it should be understood that the invention is in no sense limited thereby, and its scope is to be determined by that of the following claims:

What is claimed is:

1. A method for conserving energy in the operation of a heating and air conditioning system in a large building, the air conditioning system having a condenser and the building having heating coils therein which are heated by hot water comprising:
    a. directing water heated by the condenser of the air conditioner to a heat exchanger,
    b. directing water supplied to heating coils in the building to said heat exchanger,
    c. effecting a heat exchange between said water heated by said air conditioner condenser and said water supplied to said heating coils,
    d. directing said water heated by said condenser from said heat exchanger to a cooling tower,
    e. returning water from said cooling tower to said condenser,
    f. directing reheat water from said heat exchanger to said heating coils in said building and flowing said reheat water therethrough, and
    g. returning said reheat water from said heating coils to said heat exchanger.

2. The method of claim 1 wherein said water heated by said condenser of said air condtioner is directed to said heat exchanger of pump means.

3. The method of claim 1 wherein said water supplied to said heating coils in said building is directed to said heat exchanger by pump means.

4. The method of claim 1 wherein said heat exchanger is a shell and tube heat exchanger.

5. The method of claim 1 wherein said heat exchanger is a plate-frame heat exchanger.

6. An apparatus for conserving energy in a large building having an air conditioner utilizing a condenser and having heating coils therein which are heated by hot water comprising:
    a. condenser means,
    b. cooling tower means,
    c. heat exchanger means,
    d. heating coils means,
    e. means for conveying water heated by said condenser means to said heat exchanger means,
    f. means for conveying water heated by said condenser means from said heat exchanger means to cooling tower means,
    g. means for conveying water cooled by said cooling tower means to said condenser means,
    h. means for conveying water heated by said heat exchanger means to said heating coil means, and
    i. means for conveying water from said heating coil means to said heat exchanger means.

7. The apparatus of claim 6 wherein said means for conveying water heated by said condenser means to said heat exchanger means comprises pump means.

8. The apparatus of claim 6 wherein said means for conveying water heated by said heat exchanger means to said heating coil means comprises pump means.

9. The apparatus of claim 6 wherein said heat exchanger is a shell and tube heat exchanger.

10. The apparatus of claim 6 wherein said heat exchanger is a plate-frame heat exchanger.

* * * * *